(12) United States Patent
Jeong et al.

(10) Patent No.: US 12,515,661 B2
(45) Date of Patent: Jan. 6, 2026

(54) VEHICLE SPEED CONTROLLING APPARATUS

(71) Applicants: Hyundai Motor Company, Seoul (KR); Kia Corporation, Seoul (KR)

(72) Inventors: Ye Chan Jeong, Seoul (KR); Sang Joon Kim, Seoul (KR); Chang Hwan Kim, Seoul (KR); In Kyu Lee, Gyeonggi-do (KR); Young Sun Nam, Seoul (KR); Doo Hyun Kim, Daegu (KR); Sung Hoon Yu, Gyeonggi-do (KR); Lee Hyoung Cho, Gyeonggi-do (KR); Chang Jin Oh, Gyeonggi-do (KR); Nam Kwon Lee, Seoul (KR); Young Eun Kim, Gyeonggi-do (KR); Jong Wha Kim, Gyeonggi-do (KR); Hyun Kim, Gyeonggi-do (KR); Oh Eun Kwon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 619 days.

(21) Appl. No.: 17/947,830

(22) Filed: Sep. 19, 2022

(65) Prior Publication Data

US 2023/0234586 A1    Jul. 27, 2023

(30) Foreign Application Priority Data

Jan. 11, 2022  (KR) .......................... 10-2022-0003964

(51) Int. Cl.
*B60W 30/16*    (2020.01)
*B60W 30/14*    (2006.01)

(52) U.S. Cl.
CPC ........ *B60W 30/162* (2013.01); *B60W 30/143* (2013.01)

(58) Field of Classification Search
CPC .......................... B60W 30/162; B60W 30/143
See application file for complete search history.

(56) References Cited

U.S. PATENT DOCUMENTS 5,627,438 A    5/1997  Barrett
8,340,884 B1 * 12/2012  He ................... B60W 30/1882
                                                    340/439
8,494,737 B2   7/2013  Maier et al.
(Continued)

FOREIGN PATENT DOCUMENTS

JP    2009-190433 A    8/2009

OTHER PUBLICATIONS

L. Bayer et al., "Rocking synchronizes brain waves during a short nap," Current Biology, 2011.
(Continued)

*Primary Examiner* — Navid Z. Mehdizadeh
*Assistant Examiner* — Oliver Tan
(74) *Attorney, Agent, or Firm* — Fox Rothschild LLP

(57) ABSTRACT

A vehicle speed controlling apparatus comprising a driving mode selector configured to receive a selection of a periodic-speed driving mode from a user, a driving strategy control unit including a speed profile generator configured to generate a periodic-speed driving speed profile with a period, an amplitude, and an average speed, and a driving assistance unit configured to output a required torque for a driving motor to follow the periodic-speed driving speed profile.

11 Claims, 10 Drawing Sheets

(56) References Cited

U.S. PATENT DOCUMENTS

| | | |
|---|---|---|
| 9,592,830 B2 | 3/2017 | Roos et al. |
| 9,766,629 B1* | 9/2017 | Konchan ............... G05D 1/0257 |
| 10,635,105 B2 | 4/2020 | Subramanian et al. |
| 10,773,597 B2 | 9/2020 | Zhao et al. |
| 2014/0371986 A1* | 12/2014 | Hrovat .................. B60W 10/22 |
| | | 701/38 |
| 2019/0100204 A1 | 4/2019 | Plianos et al. |

OTHER PUBLICATIONS

A. Perrault et al., "Whole-night continuous rocking entrains spontaneous neural oscillations with benefits for sleep and memory," Current Biology, 2019.

* cited by examiner

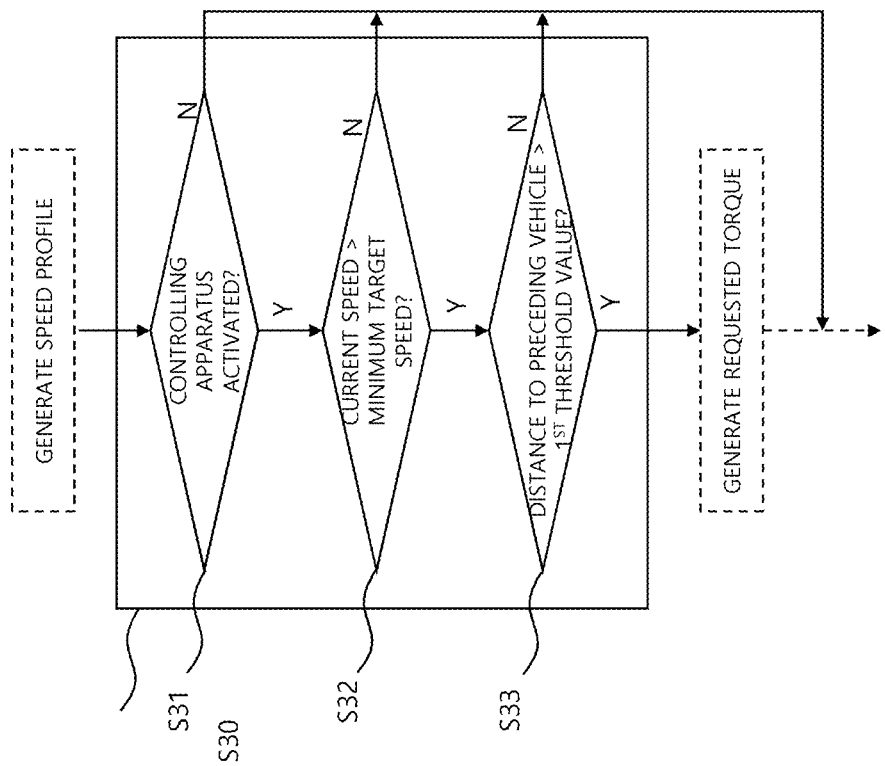

VEHICLE SPEED CONTROLLING APPARATUS

CROSS-REFERENCE TO RELATED APPLICATION(S)

This application claims, under 35 U.S.C. § 119 (a), the benefit of Korean Patent Application No. 10-2022-0003964, filed on Jan. 11, 2022, the disclosure of which is incorporated herein by reference in its entirety.

BACKGROUND

Technical Field

Embodiments of the present disclosure relate to a vehicle speed controlling apparatus.

Description of the Related Art

Various driving control technologies have been developed and are used to promote the driving convenience of a driver.

For example, there is "cruise control" as a driving control technology for driving a vehicle at a constant speed selected by the driver, or maintaining a constant inter-vehicle distance to a preceding vehicle. Recently, as a more advanced technology, "smart cruise control," for performing driving and stopping according to a vehicle speed of a preceding vehicle, has been used.

Such cruise control or smart cruise control aims to reduce driver fatigue through automatic cruising in a straight section having low traffic volume, reducing the difficulty of driving in response to a road and movement of a preceding vehicle, and promoting safe driving.

Driving control systems have been developed to maximize energy efficiency in addition to driving convenience, and one such driving control system is a "pulse-and-glide system."

Pulse-and-glide is a driving technology that maximizes energy efficiency by repeating acceleration driving (pulse) and glide driving (glide) based on a target speed when the driver sets the target speed.

Meanwhile, according to "L. Bayer et. al., "Rocking synchronizes brain waves during a short nap," Current Biology, 2011" and "A. Perrault et. al., "Whole-night continuous rocking entrains spontaneous neural oscillations with benefits for sleep and memory," Current Biology, 2019", moderate shaking is known to give people a sense of stability and help deep sleep.

The present disclosure starts from the point that a feeling of slowly shaking may be provided to a passenger by longitudinal acceleration and deceleration of a vehicle, and controlling this shaking at a specific period may increase a sense of stability felt by the passenger and help the passenger sleep.

Conventional driving control technologies are focused on driving convenience or energy efficiency. However, the present disclosure relates to driving control technology for providing a sense of stability to passengers.

SUMMARY

Objects of the present disclosure are directed to a vehicle speed controlling apparatus that substantially obviates one or more problems due to limitations and disadvantages of the existing technologies.

An object of the present disclosure is to provide a new vehicle speed controlling apparatus that is configured to increase the stability of a passenger and help the passenger sleep by controlling the longitudinal acceleration and deceleration of a vehicle according to a set profile.

Additional advantages, objects, and features of the present disclosure will be set forth in part in the description which follows and in part will become apparent to those having ordinary skill in the art upon examination of the following or may be learned from practice of the disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a vehicle speed controlling apparatus may comprise a driving mode selector configured to receive selection of a periodic-speed driving mode from a user, a driving strategy control unit comprising a speed profile generator configured to generate a periodic driving speed profile with a period, an amplitude, and an average speed, and a driving assistance unit configured to output a required torque for a driving motor to follow the periodic driving speed profile.

The period, the amplitude, and the average speed may be determined by selection of the user.

The vehicle speed controlling apparatus may further comprise a periodic-speed driving mode control entry determination unit configured to determine whether to enter control of the periodic-speed driving mode based on at least one of whether the controlling apparatus is activated, a current vehicle speed, or a distance to a preceding vehicle.

The driving strategy control unit or the driving assistance unit may comprise the periodic-speed driving mode control entry determination unit.

When the vehicle speed is equal to or less than a set minimum speed, or the distance to the preceding vehicle is less than or equal to a first reference value, the periodic-speed driving mode control entry determination unit may be configured to determine to prohibit entering the control.

The speed profile generator may be configured to generate the periodic driving speed profile by further considering at least one of traffic information, turning information, and a following degree for the periodic driving speed profile. The following degree indicates how well the vehicle follows the speed profile.

The speed profile generator may be configured to generate an initial speed profile using the period, the amplitude, and the speed.

The initial speed profile may be modified within a range between a minimum speed and a maximum speed selected by the user through weighted calculation of a predetermined weight.

The speed profile generator may be configured to modify the initial speed profile based on at least one of the traffic information, the turning information, and the following degree for the periodic driving speed profile.

The speed profile generator may be configured to modify the initial speed profile by performing weighted calculation on the initial speed profile by a first gain for the traffic information, a second gain for the turning information, and a third gain for the profile following degree.

The speed profile generator may be configured to classify the traffic information into a plurality of traffic congestion levels, and vary a value of the first gain depending on the traffic congestion level, the vehicle speed, and the amplitude, may classify the turning information into a plurality of rotation angle sections, and vary a value of the second gain depending on the rotation angle section, the vehicle speed, and the amplitude, and may classify the profile following degree into a plurality of levels, and vary a value of the third gain depending on the level of the following degree.

The first gain value may be set smaller as the traffic congestion level increases, set smaller as the vehicle speed increases, and set smaller as the amplitude increases, the second gain value may be set smaller as a rotation angle in the rotation angle sections increases, set smaller as the vehicle speed increases, and set smaller as the amplitude increases, and the third gain value may be set smaller as an error between a current vehicle speed and a target speed of the speed profile increases.

The driving assistance unit may be configured to additionally output a braking command for a braking device.

The driving assistance unit may be configured to output a regenerative braking amount when the braking command is output.

When a distance to a preceding vehicle is less than or equal to a second reference value, or a rate of decrease of the distance with respect to time is greater than or equal to a third reference value, the driving assistance unit may be configured to output the braking command.

The vehicle speed controlling apparatus may further comprise a driving mode selector comprising the periodic-speed driving mode and at least one driving mode of cruise control, smart cruise control, and pulse-and-glide.

The driving strategy control unit and/or the driving assistance unit may be configured to perform a function for at least one driving mode of a cruise control mode, a smart cruise control mode, and a pulse-and-glide mode.

Even though there may be a driving speed profile in which cruise control, smart cruise control, pulse-and-glide, etc. are implemented, the driving speed profile of the periodic-speed driving mode may be differentiated at least in that the period is formed longer than that of other driving modes. Since it is intended to provide a sense of stability to a passenger, the speed profile of the periodic-speed driving mode may be characterized by relatively gentle acceleration/deceleration. In addition, for example, the speed profile of the periodic-speed driving mode may be a sine waveform.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 13 illustrates a flowchart of step S30 of FIG. 11 according to the embodiment.

DETAILED DESCRIPTION

Figure 1:
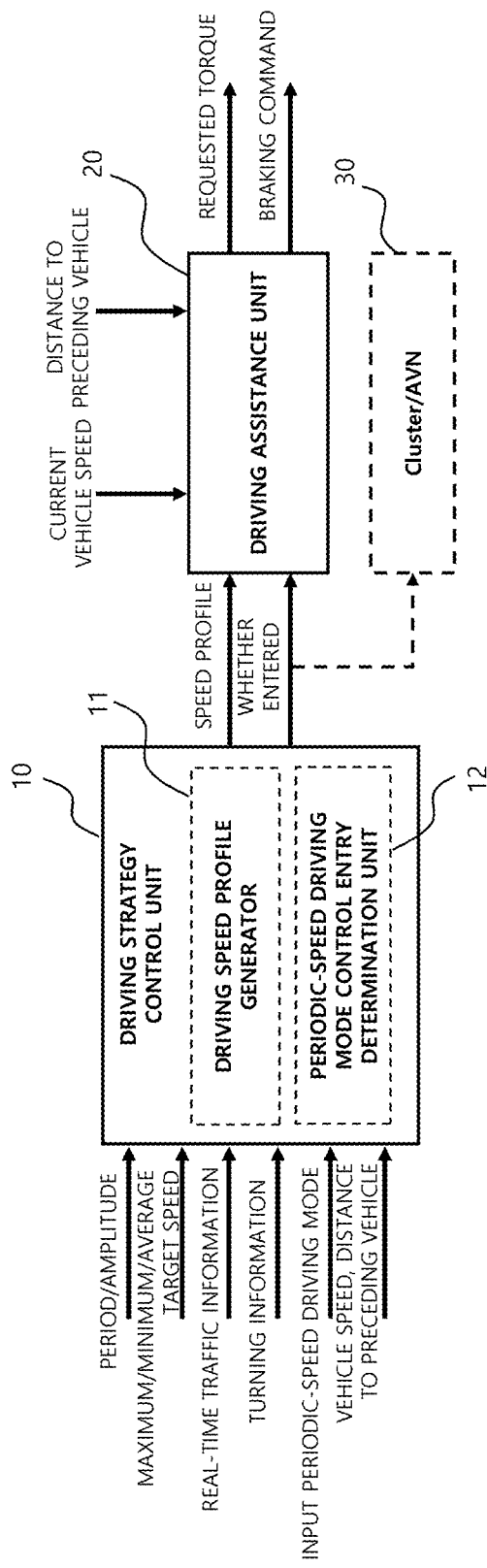
FIG. 1 illustrates a block diagram of a vehicle speed controlling apparatus according to an exemplary embodiment of the present disclosure.

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions.

Further, in describing the embodiments disclosed in the present specification, when it is determined that a detailed description of a related publicly known technology may obscure the gist of the embodiments disclosed in the present specification, the detailed description thereof will be omitted. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Although terms including ordinal numbers, such as "first", "second", etc. may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements in the middle.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, the term "unit" or "control unit" is only a widely used term for a name of a controller for controlling a specific function of a vehicle, and does not mean a generic functional unit. For example, each unit or control unit may include a communication device configured to communicate with another control device or sensor to control a function assigned thereto, a memory configured to store an operating system or logic command and input/output information, and one or more processors configured to perform determination, calculation, decision, etc. necessary for controlling the function assigned thereto.

Hereinafter, an exemplary embodiment of the present disclosure will be described in detail with reference to FIGS. 1 to 12.

FIG. 1 is a block diagram of a vehicle speed controlling apparatus, and as illustrated in the figure, the speed controlling apparatus of the present embodiment includes a driving strategy control unit 10 and a driving assistance unit 20.

The driving strategy control unit 10 includes a driving speed profile generator 11 and a periodic-speed driving mode control entry determination unit 12.

The driving strategy control unit 10 generates a speed profile (S20) and transmits the generated speed profile to the driving assistance unit 20, and the driving assistance unit 20 outputs the required torque and a braking command for a driving motor to follow the speed profile (S40 and S60). The driving motor and a braking device of the vehicle are controlled according to the requested torque and the braking command, and the vehicle may be accelerated and decelerated to follow the speed profile through this control.

The driving strategy control unit 10 receives information such as a period and amplitude, a target speed, real-time traffic information, turning information, a current vehicle speed, and a distance to a preceding vehicle, generates a speed profile using the information, and outputs a result of determination (S30) on whether to enter the corresponding driving mode.

Here, the target speed may be an average speed.

Execution of the speed controlling apparatus may be started by a command by a user such as a driver (S10). For example, an execution start command may be activated by the user selecting a periodic-speed driving mode from a driving mode selector 40 to be described later.

That is, when the periodic-speed driving mode is selected and information thereof is transmitted to the driving strategy control unit 10, the driving strategy control unit 10 executes driving strategy control for the periodic-speed driving mode.

The driving assistance unit 20 receiving the speed profile and information about whether to enter the mode uses current vehicle speed information and information about the distance to the preceding vehicle to output the required torque and the braking command (S40 and S60).

Here, by way of example, the information about whether to enter the mode output from the driving strategy control unit 10 may be transmitted to a cluster or audio video navigation (AVN) 30 so that content indicating that corresponding driving mode control is being executed may be visually output.

Figure 2:
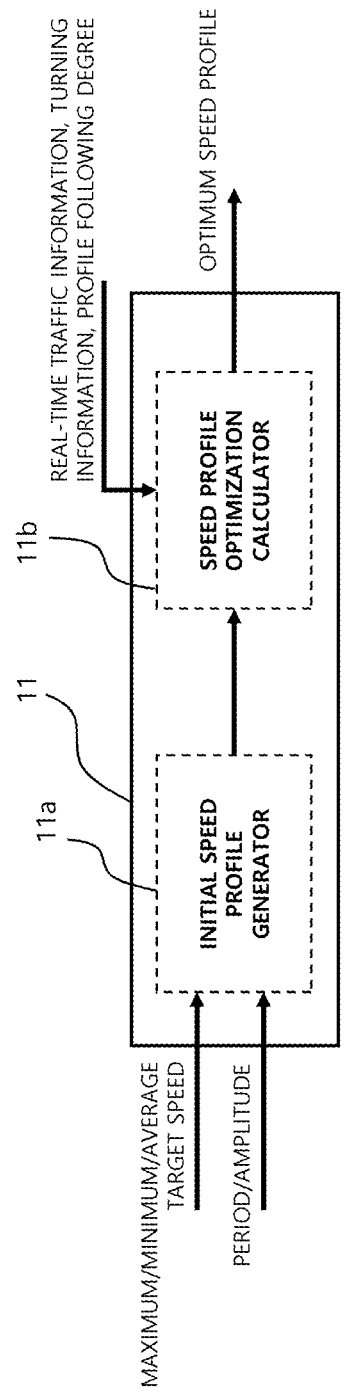
FIG. 2 illustrates a block diagram of a driving speed profile generator of FIG. 1 according to the embodiment.

FIG. 2 is a block diagram of the driving speed profile generator 11 of the driving strategy control unit 10 according to the embodiment, which will be used to specifically describe content about generation of the speed profile.

First, the driving speed profile generator 11 includes an initial speed profile generator 11a and a speed profile optimization calculator 11b.

An average speed may be input as the target speed, which may be input from the user, for example. That is, the user may set the target speed in relation to the speed profile of the periodic-speed driving mode.

Here, the target speed selected by the user does not have to be the same as the corresponding speed of the speed profile generated by the driving strategy control unit 10. For example, an optimal speed profile may be generated by considering other information together with the target speed selected by the user. It is obvious that, unlike this, the speed profile may be generated by applying the target speed selected by the user without change.

In addition to the speed information, information about a period and amplitude may be input, which may be input from the user, and the user may select a period and amplitude suitable for the user.

Since the speed profile may be generated by receiving the target speed, period, and amplitude from the user, a user-customized periodic-speed driving mode is possible.

Referring to user input for the target speed, period, and amplitude, the user may be allowed to directly input numerical values for each piece of information. Alternatively, a plurality of types may be set in advance, and the user may be allowed to select any one of the types.

The periodic-speed driving mode of the present embodiment may be a driving mode for providing a sense of stability to a passenger, and in order to realize this driving mode, a speed profile is significantly important, and it requires a considerable amount of trial and error for an individual to find such a speed profile. Accordingly, user convenience may be further improved by allowing a manufacturer to obtain data on various types in advance and allowing the user to select only one of the types.

For example, a description will be given of a process in which the user directly inputs a target speed by key-in and the user selects one of several types for the period and amplitude, thereby generating an initial speed profile with reference to FIG. 3.

First, the user may directly key in and input a minimum speed 60 kph, a maximum speed 120 kph, and an average speed 90 kph as a target speed through an input device such as a touch screen.

In addition, three types of amplitude such as "large", "medium", and "small", are presented, and the user may select one of types.

In addition, three types of period such as "0.25", "0.1", and "0.05" are presented, and the user may select one of the types similarly. Since the numerical presentation of the period may not be intuitive from the a point of view of the user, it is obvious that the amplitude may be expressed as "large", "medium", "small", etc. as in the case of the amplitude, unlike the embodiment of FIG. 3.

Figure 3:
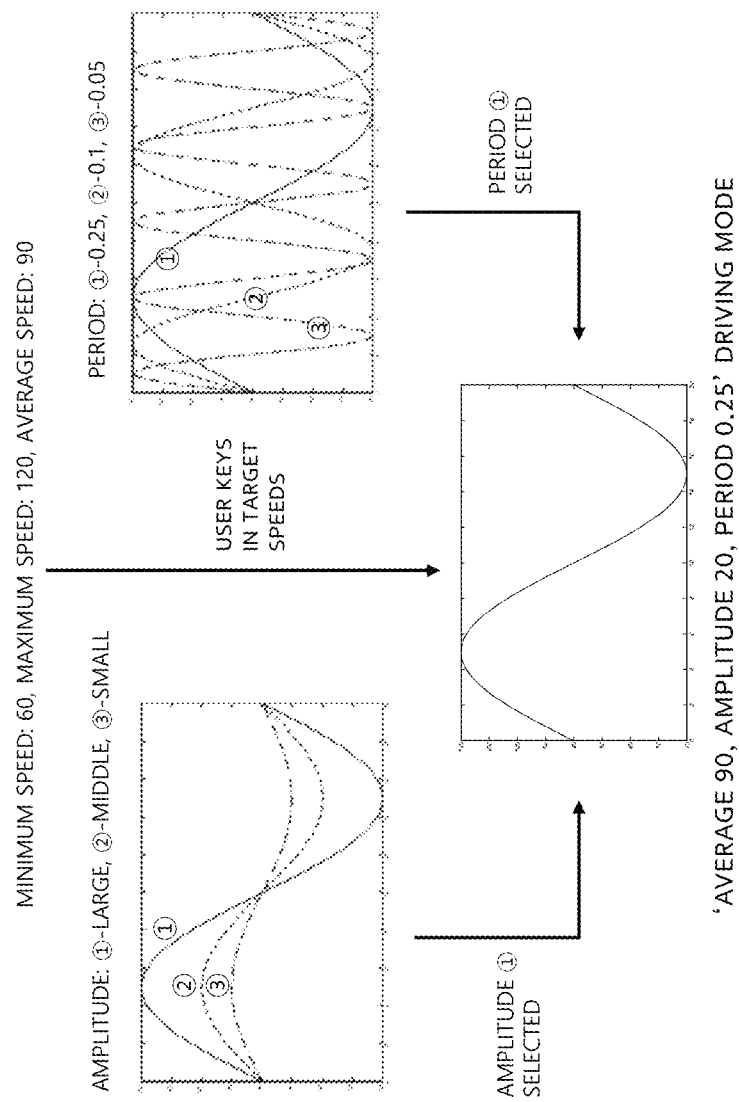
FIG. 3 illustrates an example in which an initial speed profile is generated through the driving speed profile generator of FIG. 2.

In addition, in order to further aid in the intuitive understanding of the user, a visual image such as a graph may be used together as illustrated in FIG. 3.

For example, when the type "large" is selected for the amplitude, and "0.25" is selected for the period, the initial speed profile may be generated as illustrated in FIG. 3.

In addition, the size of the initial speed profile generated in this way may be greater than the maximum speed or less than the minimum speed due to the amplitude thereof. In this case, the initial speed profile may be modified by multiplying weights to fall within a range between the minimum speed and the maximum speed.

For example, when the initially generated initial speed profile is out of the speed range, the initial speed profile may be modified to fall within the range while reducing the amplitude by 10%.

Here, the above-mentioned modification process may be omitted. In addition, for example, when the initially generated initial speed profile is out of the range between the minimum speed and the maximum speed, it may be determined to prohibit entry into the periodic-speed driving mode.

The initial speed profile generated in this way (S21) may be input to the speed profile optimization calculator 11b, may be modified through an optimization process (S22 and S23), and then may be finally output as a speed profile to be transmitted to the driving assistance unit 20.

The speed profile optimization calculator 11b selects available information from external information such as real-time traffic information, turning information, and following degree information for the speed profile (S22), and uses the information to modify and optimize the initial speed profile (S23).

Hereinafter, a detailed description will be given of a process of modifying and optimizing the initial speed profile with reference to FIGS. 4 to 7.

First, in the present embodiment, real-time traffic information, turning information, following degree information for the speed profile, etc. are used for optimization. However, the present disclosure is not limited thereto. It is obvious that one of the three types of information may be used, and other information may be additionally used.

Figure 4:
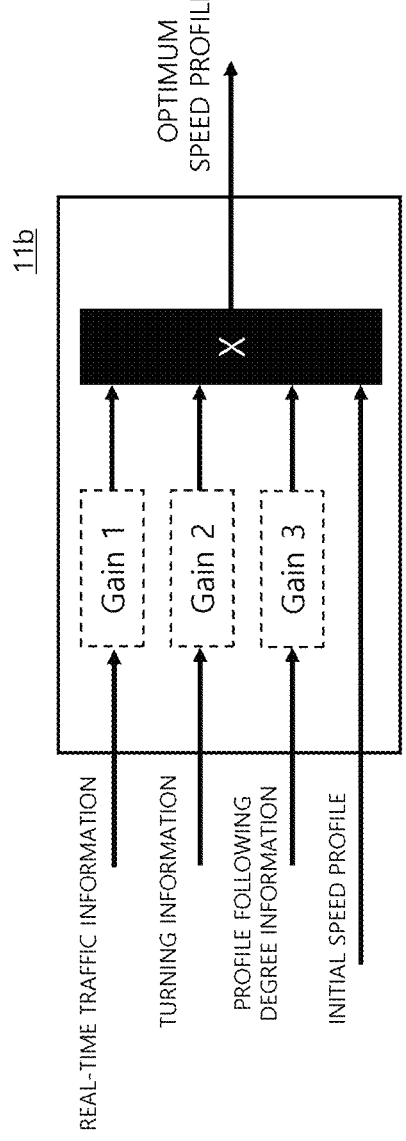
FIG. 4 illustrates a block diagram of a speed profile optimization calculator of FIG. 2 according to the embodiment.

FIG. 4 illustrates a block diagram of the speed profile optimization calculator 11b, which may be set to assign the separate gain to each of the real-time traffic information, the turning information, and the following degree information for the speed profile, and perform a multiplication operation for the initial speed profile.

That is, the first gain (Gain 1) may be assigned to the real-time traffic information, the second gain (Gain 2) may be assigned to the turning information, and the third gain (Gain 3) may be assigned to the profile following degree information, and each of the gains acts as a multiplication operation for the initial speed profile.

First, the first gain (Gain 1) for the real-time traffic information will be described using an example of FIG. 5.

Figure 5:
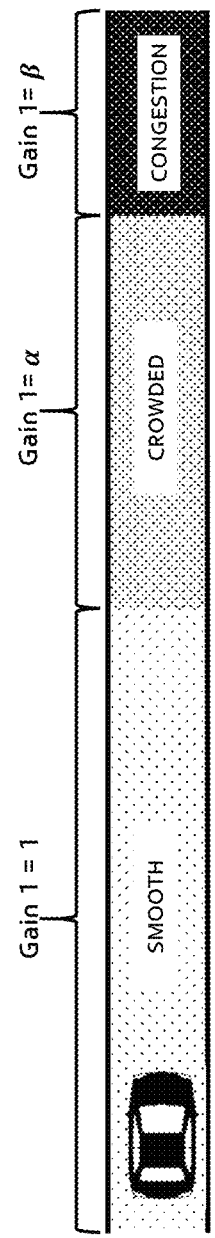
FIG. 5 schematically illustrates that a first gain value varies according to a degree of traffic congestion.

The real-time traffic information may include traffic congestion information, and as illustrated in FIG. 5, the information may be classified into "smooth", "crowded", "congestion", etc. according to a traffic congestion level, and the first gain (Gain 1) may be set differently for each classification.

In this instance, the value of the first gain (Gain 1) may be differently set according to the vehicle speed, the amplitude, and/or the period.

In more detail, a smaller value may be used as the vehicle speed increases for the same congestion level and amplitude. In addition, a smaller value may be used as the amplitude increases for the same congestion level and vehicle speed. In addition, a smaller value may be used as the congestion is more severe for the same vehicle speed and amplitude. As a result, the value of the first gain (Gain 1) may be expressed as a three-dimensional table in consideration of the congestion level, the vehicle speed, and the amplitude.

For example, when the amplitude is selected as "small", values α and β of the first gain (Gain 1) of FIG. 5 for the vehicle speed may be set as shown in the following Table 1.

TABLE 1

| Vehicle speed | α | β |
|---|---|---|
| 60 kph or less | 0.75 | 0.55 |
| 60 to 70 kph | 0.7 | 0.5 |
| 70 to 80 kph | 0.65 | 0.45 |
| 80 to 90 kph | 0.6 | 0.4 |
| 90 to 100 kph | 0.55 | 0.35 |

In addition, when the amplitude is selected as "middle", the values α and β of the first gain (Gain 1) of FIG. 5 for the vehicle speed may be set as shown in the following Table 2.

TABLE 2

| Vehicle speed | α | β |
|---|---|---|
| 60 kph or less | 0.7 | 0.5 |
| 60 to 70 kph | 0.65 | 0.45 |
| 70 to 80 kph | 0.6 | 0.4 |
| 80 to 90 kph | 0.55 | 0.35 |
| 90 to 100 kph | 0.5 | 0.3 |

In addition, when the amplitude is selected as "large", the values α and β of the first gain (Gain 1) of FIG. 5 for the vehicle speed may be set as shown in the following Table 3.

TABLE 3

| Vehicle speed | α | β |
|---|---|---|
| 60 kph or less | 0.65 | 0.45 |
| 60 to 70 kph | 0.6 | 0.4 |
| 70 to 80 kph | 0.55 | 0.35 |
| 80 to 90 kph | 0.5 | 0.3 |
| 90 to 100 kph | 0.45 | 0.25 |

Real-time traffic information may additionally include information such as road construction, accidents, etc. in addition to the congestion information, and it is obvious that the first gain (Gain 1) value may be set differently depending on the type of information. Next, the second gain (Gain 2) for turning information will be described with reference to FIG. 6.

First, the turning information may be obtained from map data, a lateral acceleration sensor, a steering wheel angular velocity sensor, etc., and the value of the second gain (Gain 2) may be set differently for each rotation angle section so that the amplitude of the speed is inversely proportional to the absolute value of the rotation angle.

The value of the second gain (Gain 2) may be set in consideration of the current vehicle speed and amplitude. For the same degree of rotation angle and amplitude, a smaller value may be set as the vehicle speed increases. For the same degree of speed and rotation angle, a smaller value may be set as the amplitude increases. As a result, the value of the second gain (Gain 2) may be expressed as a three-dimensional table in consideration of the rotation angle, amplitude, and vehicle speed.

Figure 6:
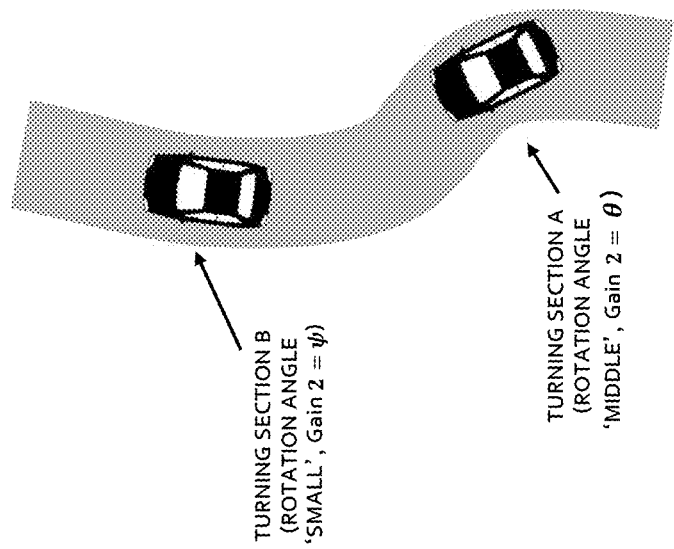
FIG. 6 schematically illustrates that a second gain value for each turning angle section varies according to turning information.

For example, values θ and ψ of the second gain (Gain 2) according to the rotation angle in a turning state of FIG. 6 may be set as shown in Tables 4 and 5 below, respectively.

First, the value θ of the second gain (Gain 2) for a turning section A may be set as shown in Table 4 according to the vehicle speed and amplitude.

TABLE 4

| Vehicle speed | Amplitude "small" | Amplitude "middle" | Amplitude "large" |
|---|---|---|---|
| 50 kph or less | 0.8 | 0.77 | 0.74 |
| 50 to 60 kph | 0.77 | 0.74 | 0.71 |
| 60 to 70 kph | 0.74 | 0.71 | 0.68 |
| 70 to 80 kph | 0.71 | 0.68 | 0.65 |
| 80 to 90 kph | 0.68 | 0.65 | 0.62 |

Further, the value ψ of the second gain (Gain 2) for a turning section B may be set as shown in Table 5 according to the vehicle speed and amplitude.

TABLE 5

| Vehicle speed | Amplitude "small" | Amplitude "middle" | Amplitude "large" |
|---|---|---|---|
| 50 kph or less | 0.9 | 0.87 | 0.84 |
| 50 to 60 kph | 0.87 | 0.84 | 0.81 |
| 60 to 70 kph | 0.84 | 0.81 | 0.78 |
| 70 to 80 kph | 0.81 | 0.78 | 0.75 |
| 80 to 90 kph | 0.78 | 0.75 | 0.72 |

Next, the third gain (Gain 3) for the speed profile following degree will be described with reference to FIG. 7. First, the vehicle speed information stored in real time may be fetched and the vehicle speed profile following degree may be calculated. At this time, an error between an actual driving speed and a speed on the speed profile may be indexed, the index may be divided into sections according to a degree of the error, and a gain value may be set to adjust the amplitude to be smaller as the error increases.

Figure 7:
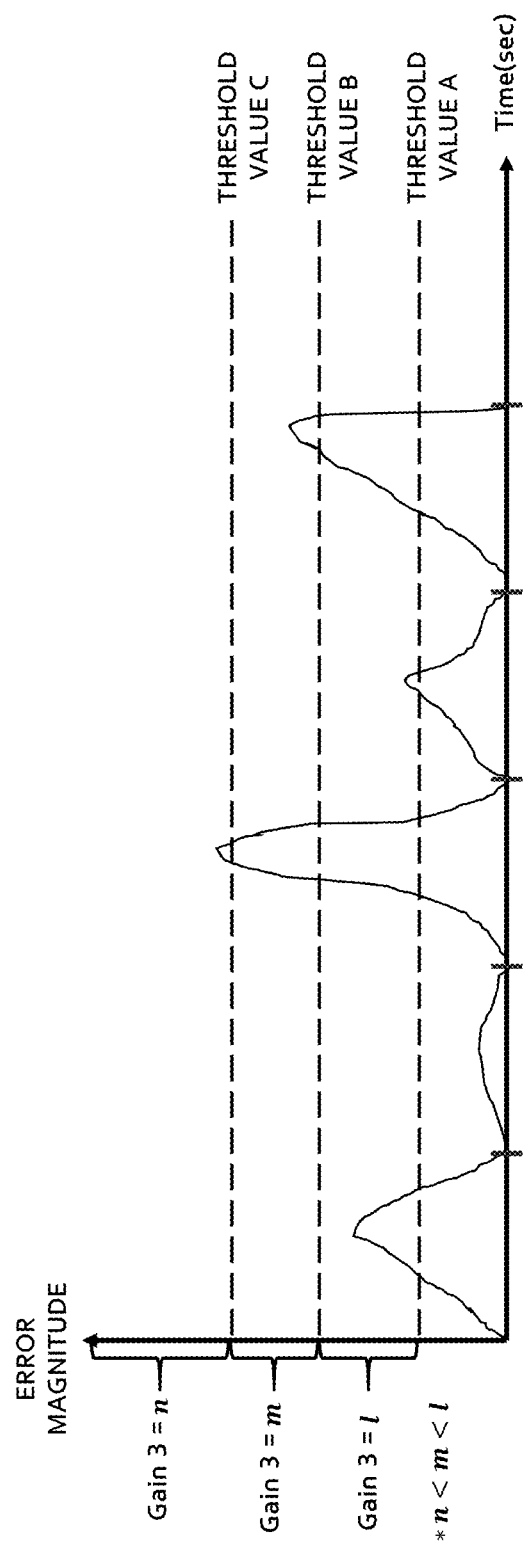
FIG. 7 schematically illustrates that the third gain varies according to a speed profile following degree.

For example, as illustrated in FIG. 7, three threshold values for the error magnitude are set, and the value of the third gain (Gain 3) may be set differently to l, m, n, etc. according to a section between the threshold values. Here, the magnitude of the gain value is $n<m<1$.

Figure 8:
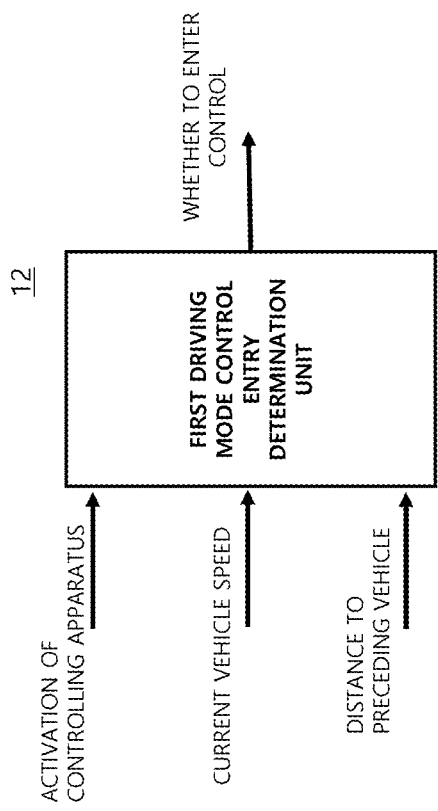
FIG. 8 illustrates a block diagram of a periodic-speed driving mode control entry determination unit according to the embodiment.

FIG. 8 illustrates a block diagram of the periodic-speed driving mode control entry determination unit 12, which will be described in detail.

In order to determine whether to enter the periodic-speed driving mode (S30), information such as activation of the controlling apparatus, the current vehicle speed, and the distance to the preceding vehicle may be used. All the information may be used as in the present embodiment. However, the present disclosure is not limited thereto, and any one piece of the information may be used.

As a case in which all the information is used, for example, as illustrated in FIG. 13, activation of the controlling apparatus may be checked (S31), it may be verified whether the current speed is equal to or greater than the minimum target speed (S32), and then it may be verified whether the distance to the preceding vehicle is equal to or greater than a first threshold value (S33). Here, the verifications in the respective steps may not be performed in this order, and it is obvious that the order may be configured differently or may be configured so that the verifications are simultaneously performed.

Here, the activation of the controlling apparatus relates to whether the user has activated a function of the controlling apparatus of the present embodiment, which means that the periodic-speed driving mode may be controlled only when explicit function selection of the user is a prerequisite.

The activation of the controlling apparatus may be achieved by selecting the periodic-speed driving mode through the driving mode selector 40 or may be achieved through a separate on/off switch for the controlling apparatus.

Even during periodic-speed driving mode control, the user may be set to intervene in driving at any time, and the controlling apparatus may be set to be deactivated immediately upon such intervention.

When the current vehicle speed does not exceed the minimum target speed, the periodic-speed driving mode control entry determination unit 12 may be configured to determine to prohibit the control. For example, when the vehicle speed does not reach the minimum target speed since the vehicle needs to slow down, a prohibition order may be determined and issued since the periodic-speed driving mode speed control cannot be achieved.

In addition, when information about the distance to the preceding vehicle obtained through a distance detection sensor such as radar or LiDAR is less than or equal to the first threshold value, the periodic-speed driving mode control entry determination unit 12 may be configured to determine to prohibit the periodic-speed driving mode control.

In addition, the periodic-speed driving mode control entry determination unit 12 may be configured to determine whether to enter in consideration of a situation that causes a sense of difference in driving or a safety problem in addition to or instead of the above-mentioned information.

Figure 9:
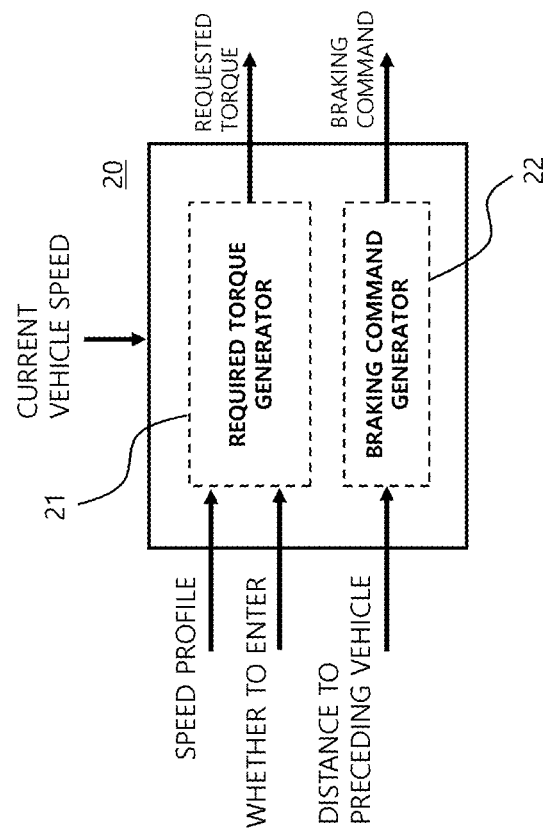
FIG. 9 illustrates a block diagram of a driving assistance unit of FIG. 1 according to the embodiment.
Figure 12:
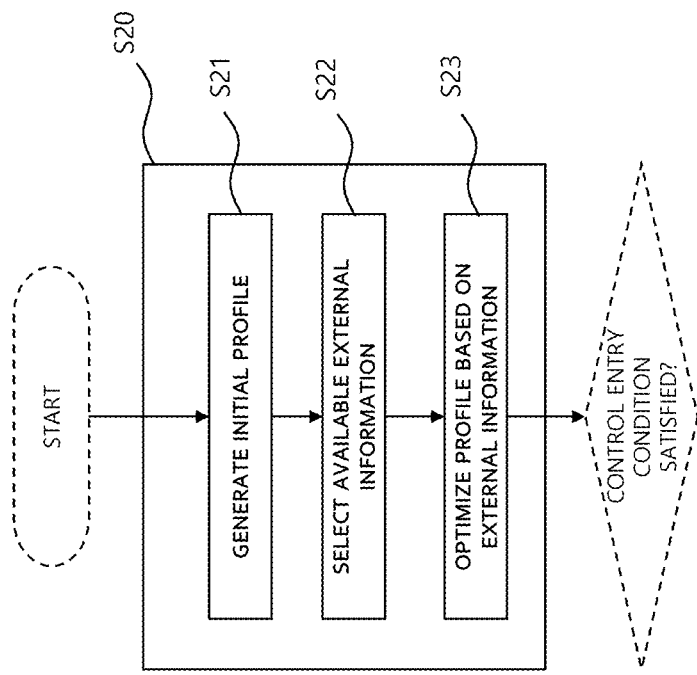
FIG. 12 illustrates a flowchart of step S20 of FIG. 11 according to the embodiment.
Figure 11:
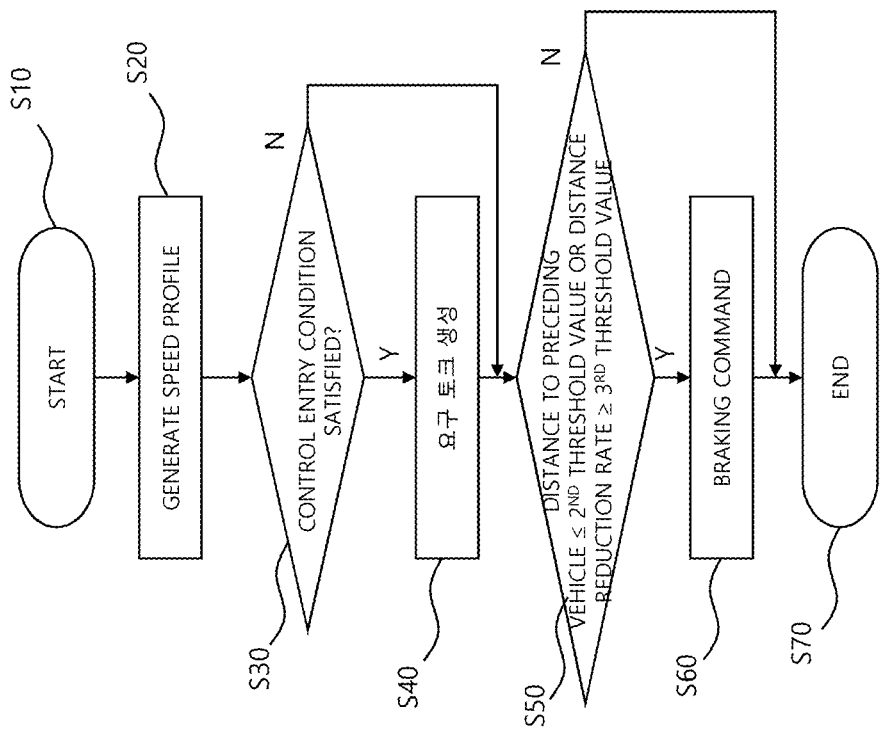
FIG. 11 illustrates a flowchart of the speed controlling apparatus according to the embodiment of the present disclosure.

FIG. 9 illustrates a block diagram of the driving assistance unit 20, which will be described in detail.

First, the driving assistance unit 20 receives the speed profile and the information about whether to enter control from the driving strategy control unit 10. In response thereto, the required torque generator 21 generates the required torque, and the braking command generator 22 generates and outputs a braking command.

When a control entry command is received, the required acceleration/deceleration torque and the braking amount are determined so that the current vehicle speed may be configured to follow the value of the speed profile (S40 and S60). Here, when determining the braking amount, the regenerative braking amount may also be determined.

On the other hand, when a control entry prohibition command is issued, the periodic-speed driving mode control may be terminated after reporting the release of control (S70), and it may be possible to switch to another driving mode such as cruise control or smart cruise control, or a manual driving mode of the driver according to user setting.

In addition, when the distance to the preceding vehicle is less than or equal to a second threshold value and/or when a distance reduction rate with respect to time is greater than or equal to a third threshold value, it may be set to issue a braking command (S60). Further, in this case, the periodic-speed driving mode control may be terminated (S70).

Here, the second threshold value may be smaller than the first threshold value.

Even though the driving strategy control unit 10 issues the control entry prohibition command, the driving assistance unit 20 may be configured to issue such a prohibition command. In addition, a prohibition condition may be the same as the condition in the driving strategy control unit 10 described above, or may be made by other conditions.

In addition, similarly, when a control entry prohibition command is issued from the driving assistance unit 20, after reporting the release of control, it may be possible to switch to another driving mode such as cruise control or smart cruise control, or to a manual driving mode of the driver according to user setting.

Figure 10:
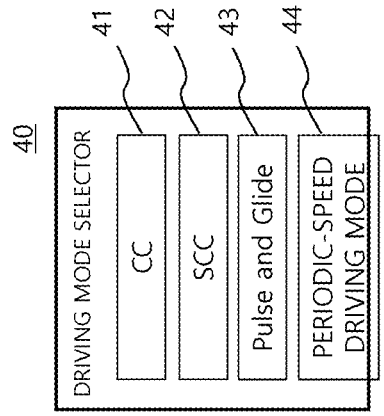
FIG. 10 illustrates a block diagram of a driving mode selector according to the embodiment.

FIG. 10 illustrates the driving mode selector 40. The driving mode selector 40 may be implemented as a touch screen provided in a vehicle cabin. However, the present disclosure is not limited thereto.

As illustrated in the figure, the driving mode selector 40 of FIG. 10 includes a cruise control (CC) selection unit 41, a smart cruise control (SCC) selection unit 42, and a pulse-and-glide selection unit 43, a periodic-speed driving mode selection unit 44, etc.

It is obvious that, when cruise control, smart cruise control, pulse-and-glide, etc. are selected, the driving strategy control unit 10 and/or the driving assistance unit 20 may be configured to perform a function set for the driving mode. Here, since a technology for implementing the function is known in the past, a detailed description thereof will be omitted.

Figure 14:
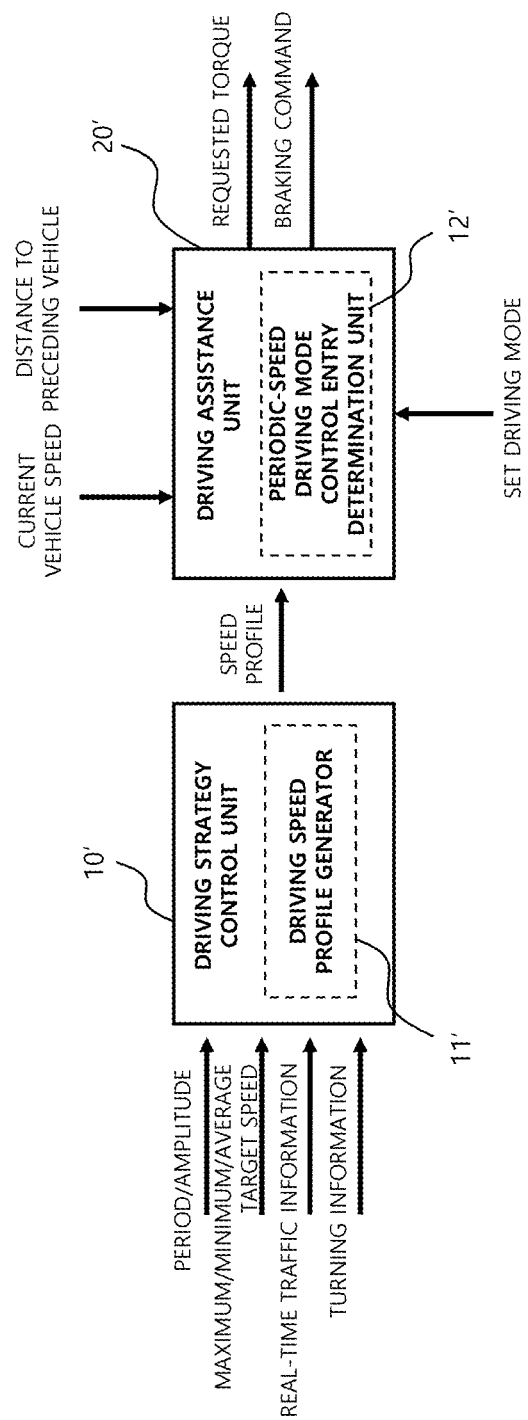
FIG. 14 illustrates a block diagram of a speed controlling apparatus according to another embodiment of the present disclosure.

Meanwhile, FIG. 14 illustrates a block diagram of a driving control apparatus according to another embodiment of the present disclosure.

In the embodiment of FIG. 14, unlike the above-described embodiment, the periodic-speed driving mode control entry determination unit 12' is included in the driving assistance unit 20' rather than the driving strategy control unit 10'. Except for this point, the present embodiment is the same as the above-described embodiment, and thus a detailed description thereof will be omitted.

In the above embodiments, the driving strategy control units 10 and 10' may be configured to each include a data input/output device, at least one processor for performing determination, calculation, decision, etc., and a memory for storing an operating system or a logic command and input/output information. In addition, when it is necessary to receive information through communication from the outside, a communication device may be added. However, the communication device may be separately provided in the vehicle and the driving strategy control unit 10 may be configured to receive the corresponding information through the input/output device.

Further, in the above embodiments, the driving assistance units 20 and 20' may each include a data input/output device, at least one processor for performing determination, calculation, decision, etc., and a memory for storing an operating system or a logic command and input/output information.

In addition, the driving strategy control units 10 and 10' and the driving assistance units 20 and 20' do not need to be physically separated and may be configured as one integrated unit. The integrated unit may include a data input/output device, at least one processor for performing determination, calculation, decision, etc., and a memory for storing an operating system or a logic command and input/output information. In this case, for example, the one processor performs functions such as determination and calculation for the driving strategy control units 10 and 10', as well as functions for the driving assistance units 20 and 20'.

In addition, the vehicle speed controlling apparatus of the above-described embodiments may be applied to any vehicle that may be driven by a motor, such as a hybrid vehicle or an electric vehicle.

According to at least one embodiment of the present disclosure, it is possible to obtain a new vehicle speed controlling apparatus capable of increasing a sense of stability of the passenger and facilitating sleep.

An additional effect of reducing driver fatigue through the sense of stability may be expected.

According to at least one embodiment of the present disclosure, when driving in the periodic-speed driving mode, the passenger may feel that the vehicle is slowly shaking in a pitch direction as if in a rocking cradle, and such shaking stimulates the vestibular system of the passenger to held the passenger feel a sense of stability and sleep deeply.

These new functions have the effect of maximizing driving feeling and user experience in passenger-oriented vehicles.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A vehicle speed controlling apparatus comprising:
   a communication device configured to receive a selection of a periodic-speed driving mode from a user;
   a first processor, comprising a speed profile generator, configured to:
   generate an initial speed profile with a period, an amplitude, and an average speed; and
   modify the initial speed profile based on one or more of traffic information, turning information, or a following degree for the initial speed profile; and
   a second processor configured to output a required torque for a driving motor to follow the initial speed profile;
   wherein the speed profile generator is further configured to:
   classify the traffic information into a plurality of traffic congestion levels:
   set a value of a first gain for the traffic information smaller as the traffic congestion level increases, as the vehicle speed increases, or as the amplitude increases;
   classify the turning information into a plurality of rotation angle sections:
   set a value of a second gain for the turning information smaller as a rotation angle in the rotation angle section increases, as the vehicle speed increases, or as the amplitude increases;
   classify the following degree into a plurality of levels, and
   set a value of a third gain for the following degree smaller as an error between a current vehicle speed and a target speed of the profile increases.

2. The vehicle speed controlling apparatus according to claim 1, wherein the period, the amplitude, and the average speed are determined by a selection of the user.

3. The vehicle speed controlling apparatus according to claim 1, further comprising a third processor configured to determine whether to enter a control of the periodic-speed driving mode based one or more of the following:
   whether the controlling apparatus is activated;
   a current vehicle speed; and
   a distance to a preceding vehicle.

4. The vehicle speed controlling apparatus according to claim 3, wherein the first processor or the second processor comprises the third processor.

5. The vehicle speed controlling apparatus according to claim 3, wherein, when the vehicle speed is equal to or less than a set minimum speed, or the distance to the preceding vehicle is less than or equal to a first reference value, the third processor is configured to determine to prohibit entering the control.

6. The vehicle speed controlling apparatus according to claim 1, wherein:
   the initial speed profile is modified to fit in a range between a minimum speed and a maximum speed through multiplication by a predetermined weight, and
   the minimum speed and the maximum speed are selected by the user.

7. The vehicle speed controlling apparatus according to claim 1, wherein the second processor is configured to additionally output a braking command for a braking device.

8. The vehicle speed controlling apparatus according to claim 7, wherein the second processor is configured to output a regenerative braking amount when the braking command is output.

9. The vehicle speed controlling apparatus according to claim 7, wherein, when a distance to a preceding vehicle is less than or equal to a second reference value, or a rate of decrease of the distance with respect to time is greater than or equal to a third reference value, the second processor is configured to output the braking command.

10. The vehicle speed controlling apparatus according to claim 1, wherein the communication device comprises the periodic-speed driving mode and at least one driving mode of a cruise control mode, a smart cruise control mode, and a pulse-and-glide mode.

11. The vehicle speed controlling apparatus according to claim 10, wherein the first processor and/or the second processor is configured to perform a function for at least one driving mode among cruise control, smart cruise control, and pulse-and-glide.

* * * * *